Patented June 11, 1940

2,204,234

UNITED STATES PATENT OFFICE 2,204,234

TREATMENT OF HYDROCARBON OILS

Walter A. Schulze, Bartlesville, Okla., assignor to Phillips Petroleum Company, a corporation of Delaware No Drawing. Application November 9, 1938, Serial No. 239,732

7 Claims. (Cl. 196—29)

This invention pertains to the treatment of hydrocarbon oils for the removal therefrom of mercaptans or organic sulfur compounds responsible for bad odor or "sourness" in the oils. More specifically, this invention relates to an improved method for treating petroleum naphthas, kerosene and heating oils, the method involving a sweetening treatment with copper-containing reagents and a stabilizing treatment to prevent deterioration with respect to color and other properties.

The so-called copper sweetening processes whereby mercaptans in an oil are converted to the less objectionable disulfides by admixing air in the oil and filtering the mixture through a bed of adsorbent material, such as fuller's earth, impregnated with a solution of a soluble copper salt and a soluble chloride possess economical advantages which have resulted in the widespread adoption of these processes in the treatment of natural, vapor recovery and straight run gasolines. In attempts to adapt these processes to kerosenes, heating oils and the like which contain higher boiling mercaptans than the gasolines referred to, it has been found that these oils after filtration through such sweetening reagents usually retain in solution minute quantities of soluble organic copper compounds believed to be the cuprous mercaptides formed from these higher boiling mercaptans. Such compounds retained by the oil after the sweetening treatment are active catalysts for deteriorative changes involving the formation of colorbodies, gums, resins and non-volatile residues in the oil.

In order to prevent the said deteriorative reactions which are catalyzed by the copper salts dissolved in the oil, it is necessary to treat the oil after sweetening in such manner as to remove the copper from the oil.

In application Serial No. 11,733, filed March 18, 1935, and issued as U. S. Patent No. 2,081,309 on May 25, 1937, I described a method for stabilizing an oil treated with copper to delay, reduce or prevent deteriorative changes by contacting said oil with an adsorbent carrier material impregnated with an aqueous solution of an alkaline sulphide, whereby the copper is removed as the corresponding sulfide. Such methods presume the absence of oxygen from the oil undergoing treatment, otherwise the sulfide which is readily susceptible to oxidation would soon be destroyed. In the practice of sweetening by filtering over adsorbents impregnated with copper-containing reagents a considerable excess of air over that theoretically required for the oxidation of the mercaptans must be added to the oil to maintain the sweetening reagent in a regenerated state. Thus the oil immediately following the sweetening treatment contains an appreciable amount of air (oxygen) in solution and in some instances even undissolved air. In commercial practice, it is not feasible to remove this air prior to the stabilizing treatment for the removal of traces of copper compounds, hence a stabilizing treatment which is operative in the presence of air is needed. The applicant has now discovered a method which is highly successful under these conditions.

The treatment of kerosene, heating oils and the like present many difficult problems if either the sweetening or the stabilizing steps involve the use of liquid treating agents. Due to the higher gravity and viscosity of these oils, separation of the treating agent from the oil is exceedingly slow and sometimes clarification is not even complete after standing a week or more in a tank. It is, therefore, highly desirable to eliminate liquid treatment of such oils whenever possible to do so. Applicant's invention, described below, makes it possible to produce finished oils of the character described without the use of any liquid solutions whatever.

One object of this invention is to provide an efficient process for sweetening and properly stabilizing petroleum distillates of the character of naphthas, kerosenes and heating oils without the use of liquid treating agents.

Another object of this invention is to provide a method for removing the traces of copper compounds remaining in hydrocarbon oils which have been sweetened by filtration through a copper chloride-containing reagent, such oils normally containing an appreciable amount of free oxygen.

Another object of this invention is to produce hydrocarbon oils free of traces of copper compounds after sweetening by means of solid reagents consisting of soluble copper and chloride salts adsorbed on clay or fuller's earth.

A further object is to produce oils such as naphthas, kerosenes, heating oils and the like that are stable with regard to the formation of color and gum following sweetening treatment with solid reagents comprising soluble copper and chloride salts adsorbed on clay or fuller's earth.

I have now discovered that the traces of oil-soluble copper compounds remaining in the above described hydrocarbon oils which have been sweetened by passage over solid copper-containing reagents may be effectively removed by allowing such contaminated oils to percolate or filter over a solid adsorbent material of the clay type, such as fuller's earth, which has been impregnated with an aqueous solution, an acid, an acid salt, or combination, which is capable of imparting to the adsorbed aqueous phase a pH less than 4 and greater than 1 and which has no deleterious effects on the hydrocarbon oil with which it is contacted and is insoluble therein.

Among the reagents which can be used for this purpose are solutions of dilute non-oxidizing strong mineral acids such as hydrochloric, sulfuric and phosphoric acids. Also, I may use solutions of an acid in combination with salts of the same acid, the purpose of the added salts being to form a buffer solution to maintain the desired pH range. Also, I may use solutions of acid salts such as sodium acid sulfate, formed by the partial neutralization of a strong acid, and which produce in solution the desired pH. Or, I may use solutions of those weak mineral acids such as boric acid, these solutions being limited by slight ionization to a pH in my desired range. Or, I may use any combination of the above which suits my purpose. The aforesaid limits define the preferred pH range in which there are no undesirable side reactions between the acid and the oil or between the acid and the solid adsorbent material.

When a hydrocarbon oil containing small concentrations of soluble organic copper compounds comes into contact with a reagent prepared according to my method, there is a reaction which converts the organic copper compound to a form soluble in the adsorbed aqueous phase of the reagent, whereby the copper is retained by the reagent and the oil is stabilized against deterioration due to copper salts. Also, I have found that no acid is carried away from the reagent in solution in the oil, when my preferred reagent concentrations are employed.

As stated previously, the traces of copper normally exist in the form of cuprous mercaptides in kerosenes, heating oils and the like. On contacting with an acid reagent with a pH of about 1 to 4, these copper mercaptides are decomposed, giving free mercaptans and the copper salts corresponding to the acid of the reagent. The traces of mercaptans freed in this manner are too small to affect the so-called doctor test and are not harmful to the oil in any manner whatever.

In the preparation of the stabilizing reagents, it is generally preferred to spray a solution of the desired acid or acid salt on adsorbents such as fuller's earth, charcoal or the like. The amount of solution added to the adsorbent will vary somewhat with the nature of the adsorbent but should be considerably less than the amount which will be held tightly onto the adsorbent. In the case of fuller's earth, the volume of treating solution preferred is generally of the order of 5 to 10 per cent of the clay. With such a reagent there will be no tendency for the solution to be detached from the adsorbent by the oil undergoing treatment. All of the copper will be transferred from the oil to the treating reagent and the oil will be stabilized against deteriorative changes.

The following examples will serve to give specific illustrations of my process, but various modifications will be apparent to those skilled in the art to which this application pertains, and no limitation is intended.

Example 1.—A kerosene distillate when sweetened over a reagent consisting of a cupric chloride solution adsorbed on fuller's earth was unstable with regard to color and was found to contain 1 to 10 parts per million of copper. This distillate was then sweetened by passage over the same reagent described above and then immediately thereafter passed over fuller's earth impregnated with 5 per cent by weight of a saturated solution of sodium acid sulfate in water. The distillate after this treatment was color stable and free of dissolved copper salts.

Example 2.—A solvent naphtha fraction which when sweetened by passage over a reagent consisting of copper chloride solution adsorbed on fuller's earth was found to contain dissolved copper salts in excess of 1 part per million. This naphtha was then percolated through a bed of fuller's earth impregnated with 8 per cent by weight of normal hydrochloric acid solution. The naphtha leaving this reagent was free of acid and free of copper.

Example 3.—A West Texas kerosene being sweetened by means of a solid copper salt reagent was found to require stabilization to remove appreciable quantities of dissolved copper mercaptides which caused the sweetened product to lose 4 to 10 points of color (Saybolt) when stored for a week. This kerosene after sweetening was contacted with fuller's earth impregnated with 10 per cent by weight of a saturated solution of primary sodium phosphate containing sufficient phosphoric acid to result in a pH of 2.5. After passage through this reagent the kerosene was free of copper and color stable in storage.

Example 4.—A Mid-Continent heating oil with an end-point of 700 deg. F. was sweetened by passage over a reagent consisting of a solution of copper sulfate and sodium chloride adsorbed on fuller's earth. The heating oil contained more than ten parts per million of copper in the form of soluble copper compounds and was extremely color unstable. When the sweetening treatment was followed by percolation through a bed of fuller's earth impregnated with 5 per cent by weight of a saturated solution of sodium acid sulfate, the heating oil was free of copper and was color stable in storage.

In each of the above described examples, percolation of the copper sweetened oils through fuller's earth without impregnation with the acid or acid salt solution failed to remove the copper compounds from the oils. Adsorption of the copper compounds on the clay was inadequate whereas reaction with the acid reagent adsorbed onto the clay was highly effective.

The life of the stabilizing reagents is extremely long and, therefore, the cost of this step in the treatment of the oils is exceedingly low.

The operation of the process as applied to naphthas, kerosenes and heating oils is extremely simple. The sour oils free of hydrogen sulfide are (1) admixed with air, (2) filtered through a tower containing the solid sweetening reagent comprising fuller's earth impregnated with a solution of soluble copper and chloride salts, and (3) filtered through a tower containing the solid stabilizing agent comprising an adsorbent impregnated with a solution of an acid or acid salt, said solution having a pH in the range of about 1 to 4. The stabilized oil may be sent directly to storage without further treatment.

I have found that the oil may be treated at flow rates preferably in the range of 1 to 5 volumes of oil per hour per volume of sweetening reagent and a similar rate through the stabilizing reagent, although higher or lower flow rates may be possible in either step, or it may be high in one and low in the other. Temperatures are normally about atmospheric although somewhat higher or lower temperatures are possible when other variables demand such heating or cooling. Operating pressures may vary from atmospheric to 100 pounds or more, depending on the nature of the stock to be treated, the mercaptan content and the solubility of air therein.

The method of treatment as disclosed herein has many commercial advantages. The investment costs for such units amount to very little and the operation and service costs are only a mere fraction of the older methods of treatment; therefore, this invention constitutes an extremely economical method. Moreover, there is no carry-over of treating agent to contaminate the pipe lines and storage tanks, a common occurrence when treating with liquid reagents.

Having thus described my invention, what I claim is:

1. A process for sweetening and stabilizing petroleum oil of the type of naphthas, kerosenes, heating oils and the like, comprising, admixing air with the said oil, percolating the admixture of oil and air through a solid adsorbent material consisting of fuller's earth impregnated with a solution of a soluble copper salt and a soluble chloride salt, then contacting the mixture of oil and unreacted air with a solid adsorbent material consisting of fuller's earth impregnated with an aqueous solution of a non-oxidizing acid compound insoluble in the oil, said solution having a pH in the range of about 1 to 4.

2. A process for stabilizing hydrocarbon oils of the type of naphthas, kerosenes, heating oils and the like which contain traces of copper compounds resulting from sweetening with copper-containing reagents, which comprises contacting said oils with a solid adsorbent material impregnated with an aqueous solution of a non-oxidizing acid compound insoluble in the oil, said solution having a pH in the range of about 1 to 4.

3. The process set forth in claim 2 in which the acidic solution is an aqueous solution of a dilute, non-oxidizing mineral acid.

4. The process set forth in claim 2 in which the acidic solution is an aqueous solution of an acid salt.

5. The process set forth in claim 2 in which the acidic solution is an aqueous solution of a dilute, non-oxidizing mineral acid combined with a salt of said acid acting as a buffer to maintain the specified pH of the solution.

6. The process set forth in claim 2 in which the acidic solution is dilute hydrochloric acid.

7. The process set forth in claim 2 in which the acidic solution is an aqueous solution of sodium acid sulfate.

WALTER A. SCHULZE.